Jan. 20, 1970     P. F. GEORGE     3,490,951

PRIMARY CELL ASSEMBLY

Filed Nov. 2, 1967

INVENTOR.
Percy F. George
BY Earl D. Ayers
AGENT

United States Patent Office 3,490,951
Patented Jan. 20, 1970

3,490,951
PRIMARY CELL ASSEMBLY
Percy G. George, Midland, Mich., assignor to The Dow Chemical Company, Midland, Mich., a corporation of Delaware
Filed Nov. 2, 1967, Ser. No. 680,127
Int. Cl. H01m 23/06, 23/08
U.S. Cl. 136—107　　　　　　　　　　　　　　6 Claims

ABSTRACT OF THE DISCLOSURE

This invention relates to a primary cell having multiple anodes and cathodes arranged in series within a tubular shaped envelope. The cell assembly is such that both positive and negative terminals are at one end while a negative terminal is at the opposite end.

---

This invention relates to a primary cell assembly, and particularly to a primary cell assembly having two or more cells disposed in series but which retain the tubular configuration associated with so-called flashlight batteries.

It is desirable to provide increased output voltage from primary cell assemblies to be used in flashlight service, for example, because efficiency of light (lumens/watt) increases with voltage.

Flashlights wherein two or more cells are placed in series in end-to-end relationship to give the desired voltage are commonly seen.

When the separate cell method of providing higher output voltage is used, however, the cost of the system increases in direct proportion to the number of complete cells that are connected in series.

Accordingly, a principal object of this invention is to provide an improved primary cell assembly.

Another object of this invention is to provide an improved primary cell assembly which has increased output voltage as compared with a round cell type dry battery of similar size.

Another object of this invention is to provide an immary cell assembly which has improved operating characteristics.

In accordance with this invention, a primary cell assembly having one or more hollow anodes, usually cylindrical in outer configuration, which have an electrically conductive fluid impervious coating on their outer surfaces disposed between the centrally disposed cathode electrode and the usual outer anode. The inner surface of the anodes is, as usual, separated from the cathode mix by a suitable material such as kraft paper.

A negative terminal, concentric with the positive terminal cap but insulated therefrom, provides both output terminals at one end of the assembly for use when the cell assembly is provided with a "screw on" bulb and reflector assembly adapted to be coupled to the threaded outer part of the double terminal end of the assembly.

Figure 1:
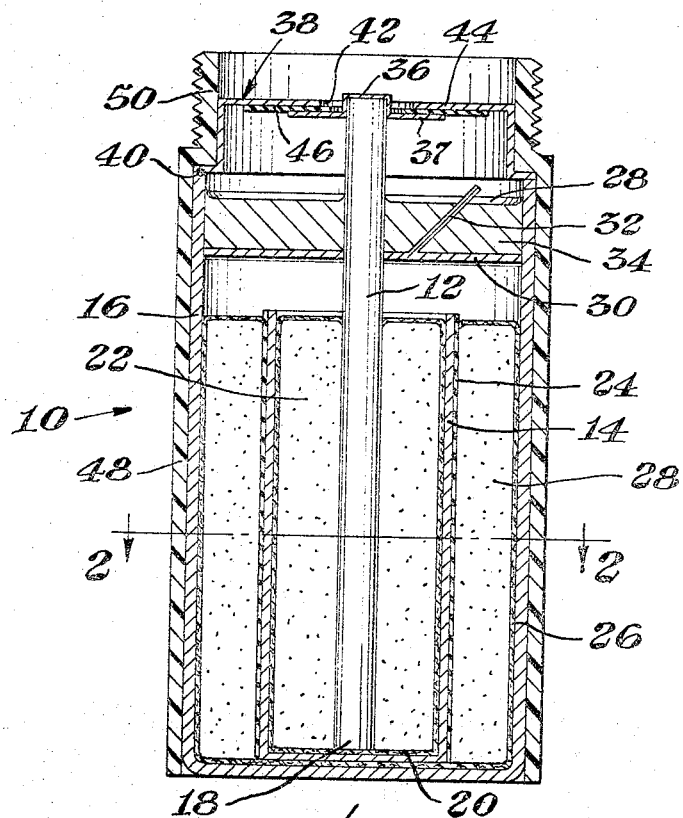
Figure 2:
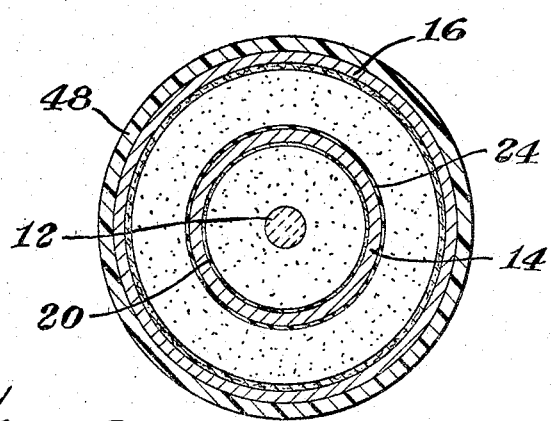

The invention, as well as additional objects and advantages thereof, will best be understood when the following detailed description is read in connection with the accompanying drawing, in which:

FIGURE 1 is a side elevational view, in section, of a primary cell assembly in accordance with this invention, and FIGURE 2 is a sectional view taken along the line 2—2 of FIGURE 1.

Referring to the drawing, there is shown a primary cell assembly, indicated generally by the numeral 10, having an axially disposed central cathode electrode, usually a carbon rod 12, which is surrounded by an inner or first anode 14 and an outer or second anode 16. The bottom 18 of the cathode electrode 12 is separated from the inner anode 14 by a paper spacer which, as illustrated, is the bottom of the paper bag-like separator member 20 which abuts against the surface of the anode 14 which faces the cathode electrode 12. The member 20 is folded inwardly towards the electrode 12 at the top of the anode 14. The space between the cathode electrode 12 and the paper separator 20 adjacent the surface of the anode 14 is occupied by a suitable cathode mix-electrolyte composition 22 which is compatible with the anode 14.

The outer surface which faces away from the cathode electrode 12 is coated, for example, with a tightly adhering, fluid impervious, electrically conductive carbon loaded epoxy coating 24 of the type disclosed in U.S. Patent No. 3,343,995 to Reid and George. The bottom of the anode 14 is separated from the bottom of the outer anode 16 by a waxed paper washer or other suitable insulating element.

The inner surface of the anode 16, which is illustrated as a cup-shaped anode, has a layer 26 of paper separating material covering that part of its inwardly facing surface against which a second quantity 28 of cathode mix-electroylte abuts. The cathode mix-electroylte 28 is disposed between the coating 24 of the inner anode 14 and the paper separator 26 abutting against the outer anode 16.

The anode 16 is substantially longer than the anode 14 but is usually shorter than the carbon cathode rod 12. A sealing-venting assembly composed of top wafer 28, bottom wafer 30 (including a vent tab 32) and a wax seal 34 sandwiched between the wafers extends between the cathode electrode 12 and the anode 16 at or near the upper end of the anode 16, effectively preventing moisture loss from the cell assembly but permitting hydrogen (released during operation of the cell assembly) to be vented from the cell.

The top end of the cathode electrode 12 has the usual metal end cap 36 (having outwardly extending flange 37) fitted over it. A somewhat hat-shaped metal connector cap, indicated generally by the numeral 38 has its outwardly extending flange at its lower end or "brim" part spot welded, as at 40, to the upper end of the anode. The connector cap 38 has an aperture 42, substantially larger than the diameter of the electrode 12, in its top 44, with the end cap 36 of the cathode 12 extends through the aperture 42.

A waxed paper or other suitably insulating washer 46 is sandwiched between the flanged part of the end cap 36 and the top 44 of the connector cap 38.

A tubular outer case 48, made of any suitable, but usually electrically insulating, material (commonly plastic sheet material) is tubular in configuration and fits closely around the outer anode 16 from the lower end thereof to a threaded inset collar 50 disposed above the upper end of the anode 16. The case 48 fits against the anode 16, with its inset collar 50 retaining the metal connector cap 38 in position atop the upper end of the anode 16.

In operation, the coating 24 on the side of the anode 14 which is remote from the cathode electrode 12, functions in effect as the cathode for the outer cell whose anode is the anode 16, thus placing the inner and outer cells in series with each other to provide a higher output voltage.

In one cell assembly made in accordance with this invention, the outside anode 16 is made of AZ31 magnesium alloy and is an impact extruded cup. The inside anode 14 is made of machined AZ21 magnesium alloy. The cathode mix-electrolyte composition is 88% manganese dioxide (chem ore), 3% barium chromate, 8% acetylene black and 1% magnesium hydroxide, wet with 550 cubic centimeters of 250 grams/liter of magnesium bromide and .25 gram/liter of sodium chromate per 1,000 grams of dry cathode mix.

The separators 20, 26 are made of kraft paper, and the coating 24 is about 2.5 to 3.0 mils thick and is made of carbon loaded epoxy of the type described earlier.

The open circuit voltage of the cell assembly described above showed 3.80 volts.

The above-described cell assembly is but one example of the present invention.

A combination of a zinc and magnesuim cell may also be made. For instance, an impact extruded or drawn can of zinc can be made for a low cost whereas an impact extruded magnesium can has been high in cost. In extruded tubing, the reverse is true, the magnesium tube is low cost and gives more capacity and voltage than the zinc. The zinc cell gives no noticeable delay in starting while the magnesium cell has a delayed action. The advantages can be combined into a cell where the anode of base cell is a can of zinc and the tubing is magnesium. This gives a battery that will give immediate light, higher voltage than two zinc cells, takes advantage of the magnesium cell's greater capacity, and makes use of the more economical shapes of the two anode materials. For this type of combination, two different cathode mix formulations would be needed to give optimum results from both the zinc and the magnesium anode, but the composition of such cathode mix-electrolyte formulations are well known to those skilled in the art.

It is also practical to make cell assemblies having anodes made of other metals than zinc or magnesium, provided compatible cathode mix-electrolyte systems are used.

While the anodes shown in the drawing are cup-like in configuration, tubular shaped anodes without bottoms may be used, in which case a rolled bottom seal between the casing and another metal is commonly used as the bottom of the casing.

What is claimed is:
1. A primary cell assembly comprising:
    (a) a cup-shaped metal outer anode of generally cylindrical transverse cross-sectional configuration and having an upper open end;
    (b) an axially disposed cathode electrode having side walls and being disposed in said outer anode and extending therefrom;
    (c) a hollow inner anode having tubular walls, said inner anode surrounding and being spaced from said cathode electrode, said inner anode having a fluid impervious, electrically conductive coating on the surface part thereof which faces away from said cathode electrode;
    (d) means for preventing a direct electrical path between said cathode electrode and said inner anode and between said inner anode and said outer anode;
    (e) sheet-like separator means disposed adjacent to the surfaces of said inner and outer anodes which face the side walls of said cathode electrode;
    (f) cathode mix-electrolyte composition disposed in contacting relationship between said cathode electrode and said separator means adjacent to said inner anode and between said coating on said inner anode and said separator means adjacent to said outer anode;
    (g) means for preventing excessive moisture loss from said assembly and for venting gases from said assembly;
    (h) an inverted cup-shaped electrode connector cap having an edge part electrically connected to said outer anode;
    (i) a cathode electrode element fitted over the end of said cathode electrode which extends from said outer anode; and
    (j) tubular casing means mechanically coupled and surrounding said outer anode and at least part of said electrode connector cap.
2. A primary cell assembly in accordance with claim 1, wherein said sheet-like separator means is a kraft paper.
3. A primary cell assembly in accordance with claim 1, wherein said cup-shaped electrode connector cap has an outwardly extended flange which rests on the upper end of said outer anode and is bonded thereto.
4. A primary cell assembly in accordance with claim 3, wherein said casing means includes an inset part which rests against said outwardly extending flange.
5. A primary cell assembly in accordance with claim 1, wherein inner anode and said outer anode are of metals having differing electrochemical characteristics.
6. A primary cell assembly in accordance with claim 1, wherein the part of said casing means which surrounds at least part of said electrode connector cap has a grooved configuration on its outer surface.

References Cited

UNITED STATES PATENTS

| | | | |
|---|---|---|---|
| 3,278,340 | 10/1966 | Bell | 136—178 |
| 3,335,031 | 8/1967 | Kordesch | 136—107 XR |
| 3,350,235 | 10/1967 | Balaguer | 136—107 |

WINSTON A. DOUGLAS, Primary Examiner

A. SKAPARS, Assistant Examiner

U.S. Cl. X.R.

136—121